US010788600B2

(12) United States Patent
Haddy (10) Patent No.: US 10,788,600 B2
(45) Date of Patent: Sep. 29, 2020

(54) BURIED ASSET LOCATOR AND MARKER WITH MOTION SENSING FOR QUALITY CONTROL

(71) Applicant: IPEG CORPORATION, Naples, FL (US)

(72) Inventor: Alan Haddy, Naples, FL (US)

(73) Assignee: IPEG CORPORATION, Naples, FL (US)

(*) Notice: Subject to any disclaimer, the term of this patent is extended or adjusted under 35 U.S.C. 154(b) by 20 days.

(21) Appl. No.: 16/198,389

(22) Filed: Nov. 21, 2018

(65) Prior Publication Data

US 2019/0154865 A1    May 23, 2019

Related U.S. Application Data

(60) Provisional application No. 62/589,050, filed on Nov. 21, 2017.

(51) Int. Cl.
*B05B 12/14* (2006.01)
*G01V 3/00* (2006.01)
(Continued)

(52) U.S. Cl.
CPC ............ *G01V 3/165* (2013.01); *G01V 3/17* (2013.01)

(58) Field of Classification Search
CPC .... B65D 83/203; B65D 83/208; B65D 83/36; B65D 83/46; G01V 3/12; G01V 3/15;
(Continued)

(56) References Cited

U.S. PATENT DOCUMENTS

6,723,375 B2* 4/2004 Zeck ............... E21B 41/00
324/326
8,896,313 B2* 11/2014 Lindqvist ............ G01V 3/12
324/334
(Continued)

*Primary Examiner* — Alesa Allgood
(74) *Attorney, Agent, or Firm* — Mark Terry (57) ABSTRACT

A system for performing buried asset locate procedures with quality control and quality assurance processes is provided. The system includes a tubular element with a top open end and a closed bottom end, the tubular element configured for holding a plurality of marker flags; at least three electromagnetic antennas located at least partially within the tubular element, the electromagnetic antennas configured for producing electromagnetic data responsive to an electromagnetic field emanating from a buried asset; at least one PCBA located within the tubular element, the PCBA configured for reading electromagnetic data from the at least three electromagnetic antennas due to a buried asset, processing said electromagnetic data, and generating depth, current and location information about said buried asset based on said electromagnetic data; a cylindrical cap having an open top end and an open bottom end, the cylindrical cap configured for fastening to the top end of the tubular element, wherein the cylindrical cap includes a battery for powering the at least one PCBA; a display configured for communicative coupling to the at least one PCBA, wherein the display is configured for displaying the depth, current and location information produced by the at least one PCBA; and at least one fastener located on an exterior surface of the tubular element, the at least one fastener configured for coupling the tubular element to a handheld marker wand device.

4 Claims, 13 Drawing Sheets

(51) Int. Cl.
*G01V 3/08* (2006.01)
*G01V 3/165* (2006.01)
*G01V 3/17* (2006.01)

(58) Field of Classification Search
CPC .......... G01V 3/17; G01V 3/165; G01V 3/081; G01V 3/08; B05B 12/00; B05B 15/62; B05B 15/63; G01R 29/085; G01R 31/58; G01R 31/60
See application file for complete search history.

(56) References Cited

U.S. PATENT DOCUMENTS

| | | | | |
|---|---|---|---|---|
| 2010/0272885 | A1* | 10/2010 | Olsson | B65D 83/36 |
| | | | | 427/137 |
| 2013/0241559 | A1* | 9/2013 | Lindqvist | G01V 3/12 |
| | | | | 324/334 |
| 2013/0268199 | A1* | 10/2013 | Nielsen | B65D 83/203 |
| | | | | 702/7 |
| 2017/0259988 | A1* | 9/2017 | Carrette | A63C 19/06 |

\* cited by examiner

FIG. 14

BURIED ASSET LOCATOR AND MARKER WITH MOTION SENSING FOR QUALITY CONTROL

CROSS-REFERENCE TO RELATED APPLICATIONS

This patent application claims priority to a provisional patent application No. 62/589,050, filed Nov. 21, 2017, titled "Buried Asset Locator And Marker With Motion Sensing For Quality Control". The subject matter of provisional patent application 62/589,050 is hereby incorporated by reference in its entirety.

TECHNICAL FIELD

The technical field relates generally to the detection and identification of buried assets (i.e., underground utility lines) and for quality control and quality assurance in buried asset location procedures.

BACKGROUND

Utility lines, such as lines for telephones, electricity distribution, natural gas, cable television, fiber optics, Internet, traffic lights, street lights, storm drains, water mains, and wastewater pipes, are often located underground. Said utility lines described above are referred to as "buried assets" herein. Consequently, before excavation occurs in an area, especially an urban area, an excavator is typically required to clear excavation activities with the proper authorities and service providers. The clearance procedure usually requires that the excavator contact a central authority (such as "One Call", "811" and "Call Before You Dig," which are well known in the art) which, in turn, sends a notification to the appropriate utility companies. Subsequently, each utility company must perform a buried asset detection procedure, which includes having a field technician visit the proposed excavation site, detecting the relevant buried assets and physically marking the position of the buried asset using temporary paint or flags.

Usually, a field technician visiting a proposed excavation site utilizes a portable electronic device known as a pipe or cable locator, an electromagnetic locate device ("ELD"), an electromagnetic locator, a buried asset locate device, or a buried asset locator (collectively referred to herein as an "ELD"). Said ELDs are commercial, off-the-shelf, devices employed to detect and identify the position of buried assets. ELDs are usually used in conjunction with a transmitter, so as to create a field that can be detected by the ELD. This is typically achieved by connecting the transmitter to a suitable connection point (i.e., pedestal, hydrant, manhole, removable cover, lid, junction box or other access point) of the buried asset, wherein the transmitter sends a signal of a specific frequency onto the buried asset. Subsequently, the ELD is "tuned" to the specific frequency in order to locate the resulting electromagnetic signal radiating from the buried asset, thus enabling the position and route of the buried asset to be marked with paint or flags above surface. The above noted procedure requires that the technician carry an ELD to detect the buried assets, as well as a separate device for marking the ground with paint or flags, referred to as a handheld paint marking device or a handheld marker wand. This can be unwieldly, complicated and annoying for a technician who may perform a large number of buried asset procedures in a single day.

Furthermore, best practice standards require the technician perform very specific and consistent physical motions with the ELD such as sweeping, rotating and lifting, all while the ELD must be orientated correctly to the plane of the buried asset to ensure correct geometric alignment with the radiated electromagnetic field. The process of detecting and marking out a buried asset using an ELD is referred to herein as a buried asset locate procedure, buried asset location procedure, or a buried asset detection procedure. But currently there are no existing systems or methods for collecting information about a technicians practices when performing buried asset location procedures.

Therefore, a need exists for improvements over the prior art, and more particularly for more efficient methods and systems for performing buried asset locate procedures and for measuring the performance of field technicians during a buried asset locate procedure, using conventional ELDs.

SUMMARY

A system for performing buried asset locate procedures with quality control and quality assurance processes is provided. This Summary is provided to introduce a selection of disclosed concepts in a simplified form that are further described below in the Detailed Description including the drawings provided. This Summary is not intended to identify key features or essential features of the claimed subject matter. Nor is this Summary intended to be used to limit the claimed subject matter's scope.

In one embodiment, a system for performing buried asset locate procedures with quality control and quality assurance processes is provided. The system includes a cylindrical element with a top open end and a closed bottom end, the cylindrical element configured for holding a plurality of marker flags; at least three electromagnetic antennas located at least partially within the cylindrical element, the electromagnetic antennas configured for producing electromagnetic data responsive to an electromagnetic field emanating from a buried asset; at least one PCBA located within the cylindrical element, the PCBA configured for reading electromagnetic data from the at least three electromagnetic antennas due to a buried asset, processing said electromagnetic data, and generating depth, current and location information about said buried asset based on said electromagnetic data; a tubular cap having an open top end and an open bottom end, the tubular cap configured for fastening to the top end of the cylindrical element, wherein the tubular cap includes a battery for powering the at least one PCBA; a display configured for communicative coupling to the at least one PCBA, wherein the display is configured for displaying the depth, current and location information produced by the at least one PCBA; and at least one fastener located on an exterior surface of the cylindrical element, the at least one fastener configured for coupling the cylindrical element to a handheld marker wand device.

BRIEF DESCRIPTION OF THE DRAWINGS

The accompanying drawings, which are incorporated in and constitute a part of this disclosure, illustrate various example embodiments. In the drawings.

DETAILED DESCRIPTION

The following detailed description refers to the accompanying drawings. Wherever possible, the same reference numbers are used in the drawings and the following description to refer to the same or similar elements. While embodiments may be described, modifications, adaptations, and other implementations are possible. For example, substitutions, additions, or modifications may be made to the elements illustrated in the drawings, and the methods described herein may be modified by substituting, reordering, or adding stages to the disclosed methods. Accordingly, the following detailed description does not limit the claimed subject matter. Instead, the proper scope of the claimed subject matter is defined by the appended claims.

The claimed subject matter improves over the prior art by providing a system that a technician can hold in one hand, wherein the system locates buried assets, makes paint marks on the ground, and holds marker flags. In short, the claimed subject matter marries the functionality of an ELD with a handheld paint marker device into a single, user-friendly and wieldy device. In one alternative, the system also includes quality control and quality assurance processes. The claimed subject matter also provides a more efficient, automated and precise way of measuring the performance of a field technician, using a conventional ELD, during a buried asset locate procedure for quality control and quality assurance purposes.

Figure 1:
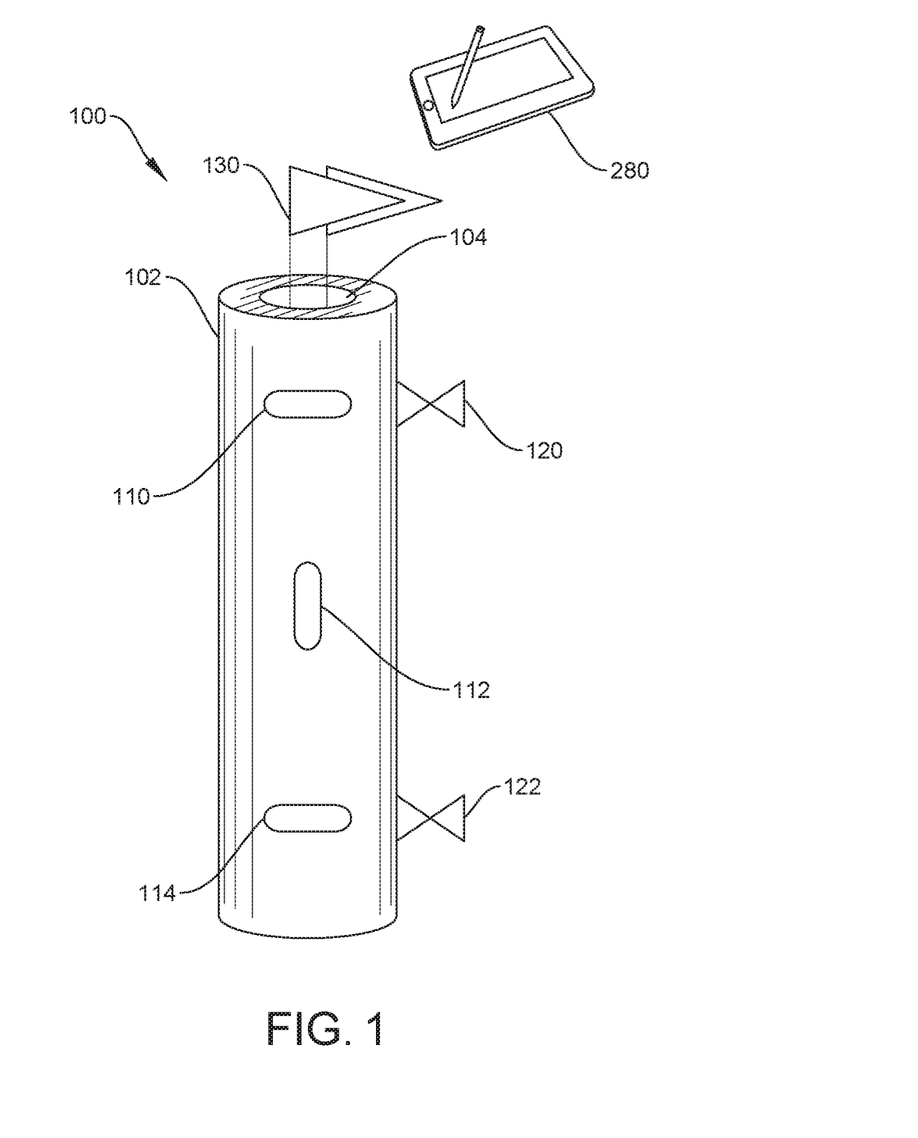
FIG. 1 is an illustration of a system for performing buried asset locate procedures, according to an example embodiment.

FIG. 1 shows that the device 100 comprises a tubular element 102 having an opening 104 in the upper end and a closed lower end, wherein the tubular element is configured to allow for insertion of marker flags 130 in the tubular element 102 via the opening 104. The device 100 can therefore be utilized to carry marker flags 130 during buried asset detection procedures.

Device 100 is further outfitted with the components necessary to perform buried asset detection procedures, including at least three electromagnetic antennas 110, 112 and 114, which are configured to sense and report on changes in the electrical and magnetic fields, as is well known in the prior art. Two of the antennas 110, 114 are configured horizontally while one antenna 112 is configured vertically.

Device 100 may also include at least one PCBA located within the tubular element 102, the PCBA configured for reading electromagnetic data from the at least three electromagnetic antennas due to a buried asset, processing said electromagnetic data, and generating depth, current and location information about said buried asset based on said electromagnetic data. A printed circuit board (PCB) mechanically supports and electrically connects electronic components using conductive tracks, pads and other features etched from copper sheets laminated onto a non-conductive substrate. Electrical components (e.g. capacitors, resistors or active devices) are generally soldered on the PCB. A PCB populated with said electronic components is referred to as a printed circuit assembly, a printed circuit board assembly (PCBA), or a circuit card assembly.

Device 100 may also include a processor that may calculate current geographical position (otherwise referred to as geographical location data). The processor may calculate current position using a satellite or ground based positioning system, such as a Global Positioning System (GPS) system, which is a navigation device that receives satellite or land based signals for the purpose of determining the device's current geographical position on Earth.

The device 100 may further includes a quality control processor that collects the following raw data produced by the PCBA as a result of performance of the buried asset location procedure by the field technician: 1) motion data from an accelerometer and a gyroscope in the system, and wherein said motion data includes motion in three dimensions, and wherein said motion data is produced as a result of movement of the system by the field technician during performance of the buried asset location procedure (may also be garnered from rotation or tilt sensor), 2) electromagnetic data from one or more electromagnetic sensors in the system, wherein said electromagnetic data includes current and depth measurements, as well as device gain and full scale deflection data, and wherein said electromagnetic data is produced as a result of movement of the system by the field technician during performance of the buried asset location procedure, 3) a mode of the system, wherein the mode includes a frequency mode of the system, and wherein the mode is set by the field technician during performance of the buried asset location procedure, and 4) position data of the system from a global navigation satellite system receiver in the system.

Motion data may include the detection and logging of various vectors in all degrees of motion, velocity and acceleration of the system. Electromagnetic data may include electrical current measurement data, resistance measurement data, impedance measurement data, electrical signal magnitude measurement data, electrical signal frequency measurement data, electrical signal voltage measurement data, etc. The electromagnetic data produced by the PCBA may be displayed in the system, wherein motion data (leading up to the logging of the electromagnetic data) from the accelerometer and gyroscope is stored, such that said motion data may be evaluated to determine proper performance and procedure of the buried asset location procedure leading up to the logging of the electromagnetic data.

A mode may include any one of a variety of modes (that are well-known in the art) in which a locator device may be placed. With regard to mode, each ELD has various modes that the field technician selects depending on type of utility, type of environment, etc. These device mode selections include frequency selections to match transmitter selection, peak signal mode, null signal mode, peak and null signal modes simultaneously, line versus sonde/probe mode. Said device mode selections may define a locate device operating mode. The system may also collect electromagnetic (EM) signal response data, which indicates how the locator device is responding to the electromagnetic signals it is detecting and processing, as well as signal strength, signal direction (left, right of target), system gain control, phase (direction) of signal, measured depth, measured current, etc. The raw data collected is then used at a later point to generate performance measurements that represent the technician's performance during said buried asset location procedure, according to industry standards.

Next, the quality control processor calculates sub-metrics based on the raw data collected above. In this step, the quality control processor calculates the following raw sub-metrics based on the data collected, and uses said sub-metrics as the component values of a first quantity vector:

a) an alignment of acceleration of the system with gravity, calculated as $$\text{mean}\left(\frac{a \cdot g}{\|a\|\|g\|}\right),$$

b) magnitude of non-gravity acceleration of the system, calculated as $\text{rms}(\|a\|-\|g\|)$, c) rotation of the ELD about its x-axis, calculated as $\text{rms}(\omega_x)$, d) rotation of the system about its y-axis, calculated as $\text{rms}(\omega_y)$, e) rotation of the system about its z-axis, calculated as $\text{rms}(\omega_z)$.

wherein a may be a vector that represents acceleration, g may be a vector that represents gravity, rms stands for root mean squared and mean stands for a statistical mean.

Next, the quality control processor calculates component values of a first exam vector based on the quantity vector, the first exam vector composed of the following components values:

a) a score based on whether the system is aligned with gravity, calculated based on $$\text{mean}\left(\frac{a \cdot g}{\|a\|\|g\|}\right),$$

b) a score based on magnitude of motion of the system, calculated based on $\text{rms}(\|a\|-\|g\|)$, c) a score based on magnitude of rotation of the system about x-axis, calculated based on $\text{rms}(\omega_x)$, d) a score based on magnitude of rotation of the system about y-axis, calculated based on $\text{rms}(\omega_y)$, e) a score based on magnitude of rotation of the system about z-axis, calculated based on $\text{rms}(\omega_z)$, f) a score based on whether rotation of the system about the z-axis is dominant calculated based on $\text{rms}(\omega_z)$, $\text{rms}(\omega_x)$ and $\text{rms}(\omega_y)$, wherein $\omega_y$ represents rotation about the y axis, $\omega_z$ represents rotation about the z axis and $\omega_x$ represents rotation about the x axis. Each of $\omega_y$, $\omega_z$ and $\omega_x$ may be rotation vectors and each may further represent an array of data representing rotation about a specific axis. In one embodiment, a score may be a numerical value, such as the numbers 0, 1 or 2. In another embodiment, a score is based on whether the resulting value is within certain ranges. For example, if $\text{rms}(\omega_x)$ is calculated to be greater than 50 units per second, then a score of 2 is applied, if $\text{rms}(\omega_x)$ is calculated to be between 18 and 50 units per second, then a score of 1 is applied, and if $\text{rms}(\omega_x)$ is calculated to be less than 18 units per second, then a score of 0 is applied. This paradigm may be applied to all factors a) through f) above.

Next, the quality control processor accesses the lookup table, and reads a performance measurement that corresponds with each one of said plurality of component values of the first exam record, so as to read a plurality of performance measurements. The result of this step is that a plurality of performance measurements are read and stored.

Alternatively, the quality control processor accesses the lookup table, and reads a performance measurement that corresponds with each one of said plurality of component values of the performance record of the field technician, so as to read a plurality of performance measurements.

Next, the quality control processor executes a visual or audio signal, if one or more of said plurality of performance measurements are below a given threshold, so as to notify the first field technician that performance of the buried asset location procedure by the first field technician is below said threshold. Also, the system may display the plurality of performance measurements, which indicates performance of the buried asset location procedure and technique of the first field technician according to said industry standards embedded in the lookup table.

The data collected above may comprise the quality control aspect of the claimed subject matter. Quality control is a process by which entities review the quality of all factors involved in production by the field technicians. Part of said process includes automated inspection or review of the data collected above and the data calculated above to determine whether said data meets industry standards.

The device 100 further includes two fasteners 120, 122, which are secured to one side of the cylindrical exterior shape of the tubular element 102, and which are used to attach the device 100 to another device, show below.

FIG. 1 also shows that the device 100 may also include an interface 280. The interface 280 may comprise a screen or display, which may be a touchscreen. This interface 280 allows the user to view buried asset location data, such as depth, current and buried asset type, as well as issue commands, such as storing buried asset location data. The interface 280 may be attached to the device 100 or to a paint marking device (see below), using a fastener.

Figure 2:
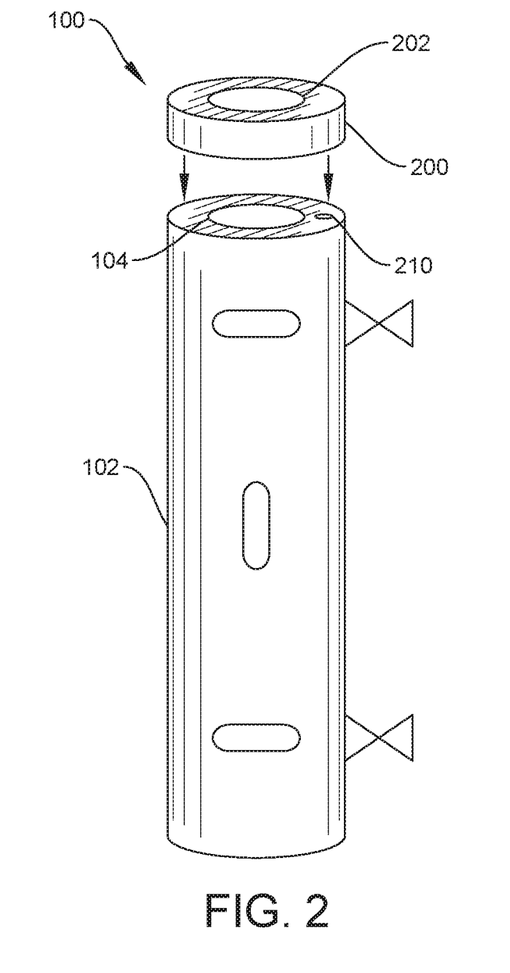
FIG. 2 is an illustration of the system for performing buried asset locate procedures, showing a removed cylindrical element, according to an example embodiment.

FIG. 2 shows an additional toroidal or cylindrical element 200, which includes an opening 202. The toroidal element 200 is configured to match the diameter and thickness of tubular element 102, and the opening 202 is configured to match the diameter of opening 104 in the tubular element 102. The tubular element 102 includes a terminal 210 that is configured to connect to a terminal (not shown) in the toroidal element 200. The toroidal element 200 is configured to be attached or coupled to the tubular element 102 such that, when connected, the exterior surface of the toroidal element 202 is an extension of the outer cylindrical shape of the tubular element 102, the opening 104 is adjacent to, and coextensive with, the opening 202, and the terminal 210 on the tubular element 102 is coupled with the terminal on the toroidal element. Element 200 may include a battery for powering the PCBA above.

Figure 3:
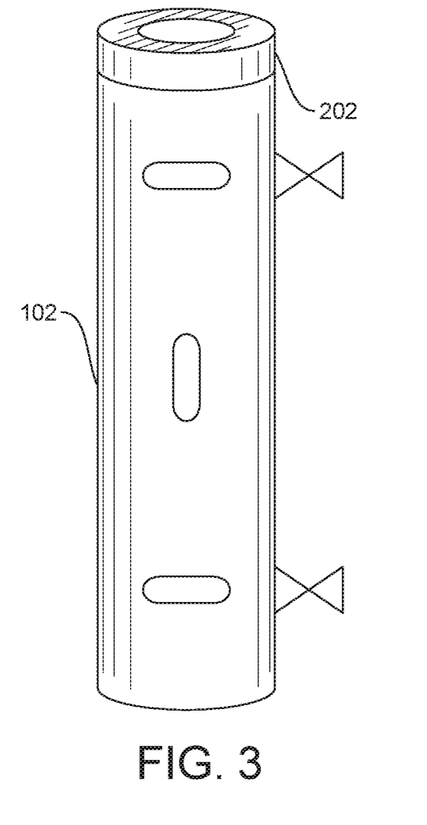
FIG. 3 is an illustration of the system for performing buried asset locate procedures, showing the cylindrical element attached, according to an example embodiment.
Figure 4:
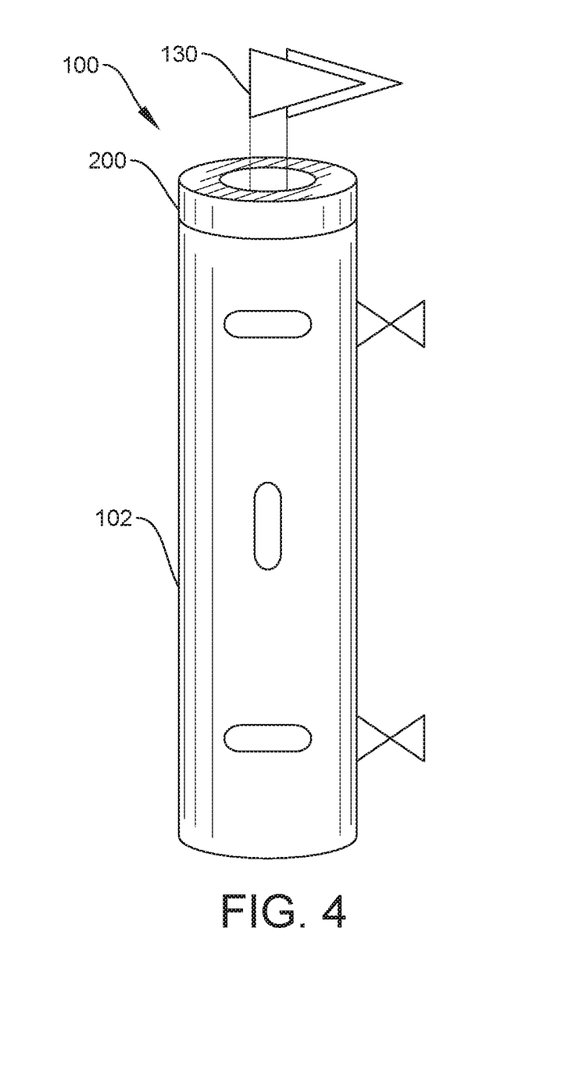
FIG. 4 is an illustration of the system for performing buried asset locate procedures, showing flags inserted, according to an example embodiment.

FIG. 3 shows the toroidal element 200 is attached or coupled to the tubular element 102. FIG. 4 shows that when the toroidal element 200 is attached or coupled to the tubular element 102, the marker flags 130 may be inserted into the opening 202, such that the device 100 can therefore be utilized to carry marker flags 130 during buried asset detection procedures.

Figure 5:
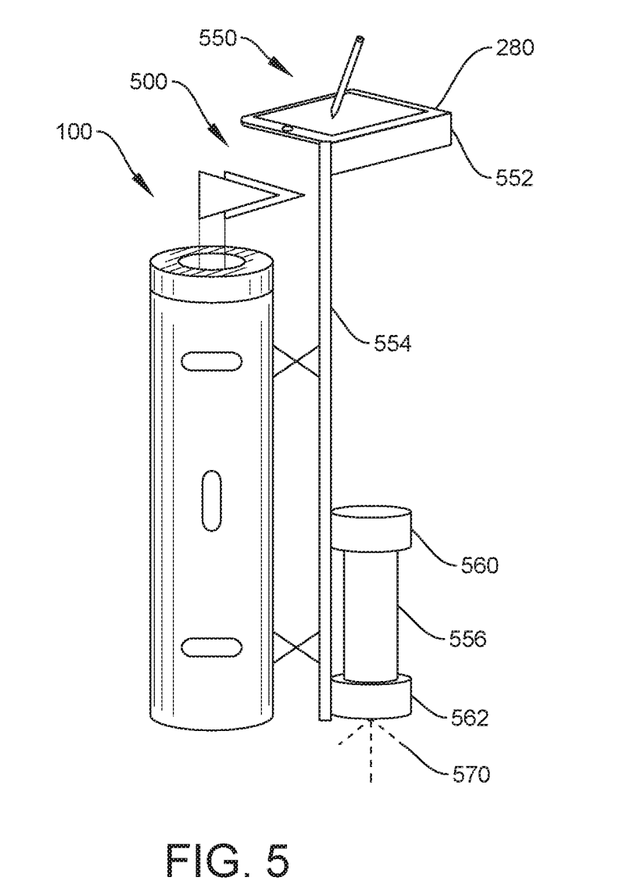
FIG. 5 is an illustration of the system for performing buried asset locate procedures, showing all components, according to an example embodiment.

FIG. 5 shows the device 100 connected or attached to a handheld paint marking device 550, also referred to as a handheld marker wand. The paint marking device 550, is a device that is well known in the art, and which comprises a handle 552, a shaft 554, a paint can 556, and a paint can holder 560, 562. The paint marking device 550 is used by field technicians to carry a paint can 556 near the ground and spray paint 570 by pulling a lever near the handle 552. This device 550 allows a field technician to carry the device 550 with his right hand extended downward at his side. In this position, since the paint can 556 is near the ground, and the lever is located at the fingertips of his right hand, the field technician may pull the lever and spray paint 570 on the ground. FIG. 5 shows that the device 100 has been attached to the shaft 554 of the device 550, which marries the marker flag carrying and buried asset locating functions of the device 100 with the paint marking functions of the device 550. In summary, the resulting system 500 combines all of the following functions: marker flag carrying, buried asset locating functions and paint marking.

Figure 6:
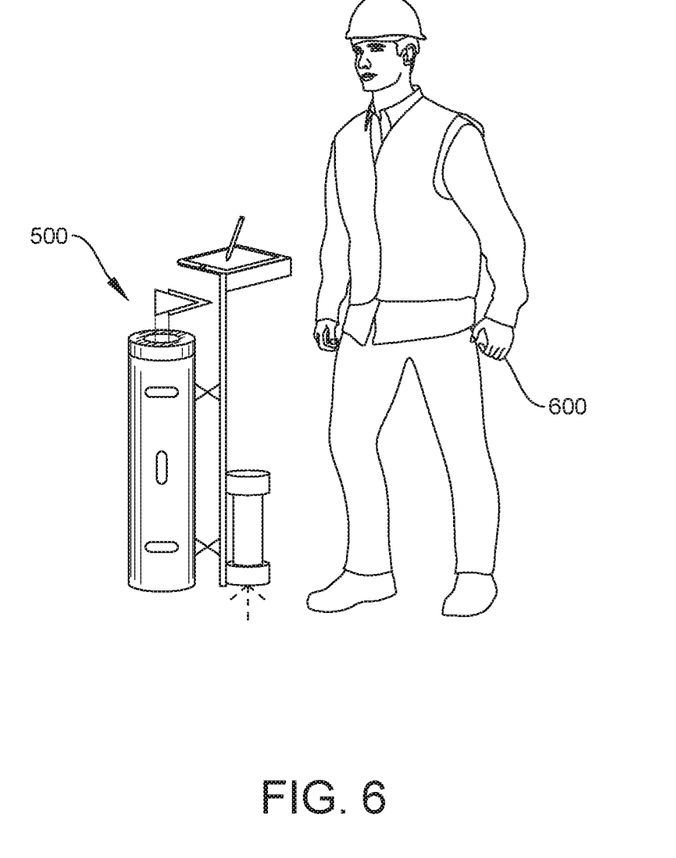
FIG. 6 is an illustration of the system for performing buried asset locate procedures during use, according to an example embodiment.

FIG. 6 shows a field technician 600 utilizing the system 500 (which comprises the device 100 and the device 550) to carry marker flags, perform buried asset locating procedures, and spray paint on the ground to indicate the placement of buried assets underground.

Figure 7:
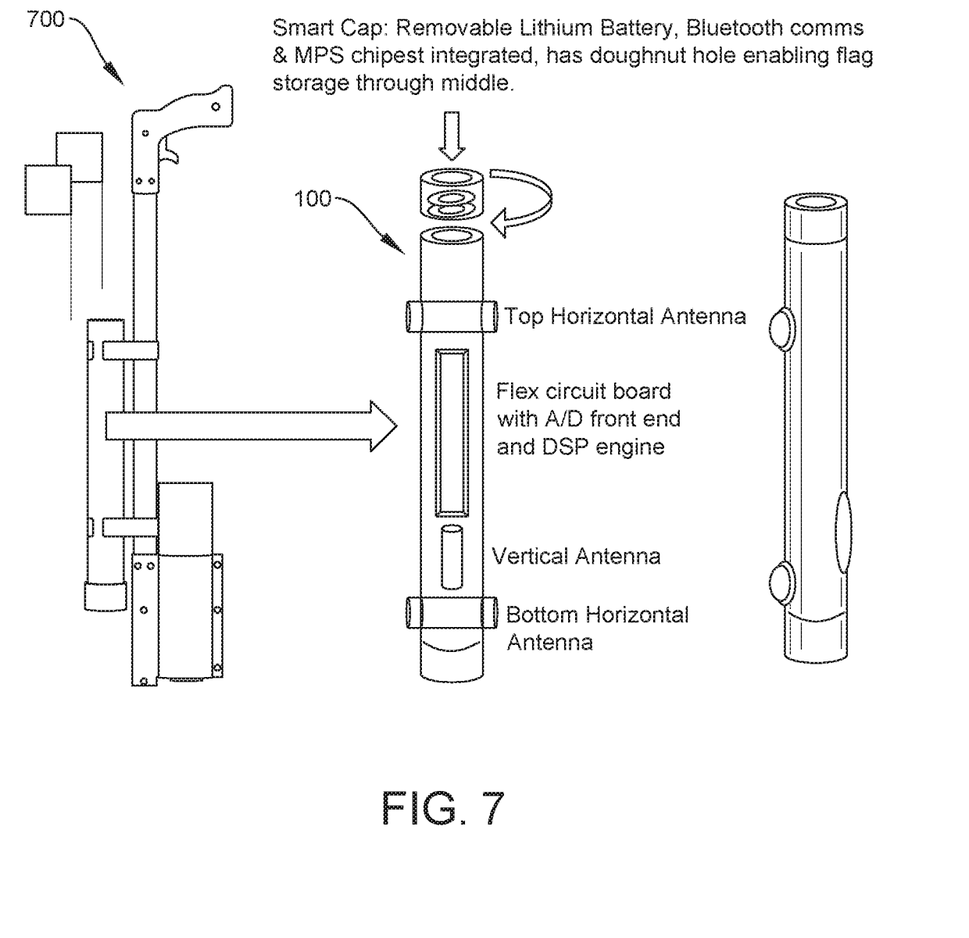
FIG. 7 is an illustration of the system for performing buried asset locate procedures, showing various components, according to an example embodiment.

FIG. 7 shows another view 700 of the device 100 connected or attached to a handheld paint marking device 550 on the left. FIG. 7 also shows the device 100 with the toroidal element 200 attached or coupled to the tubular element 102.

Figure 8:
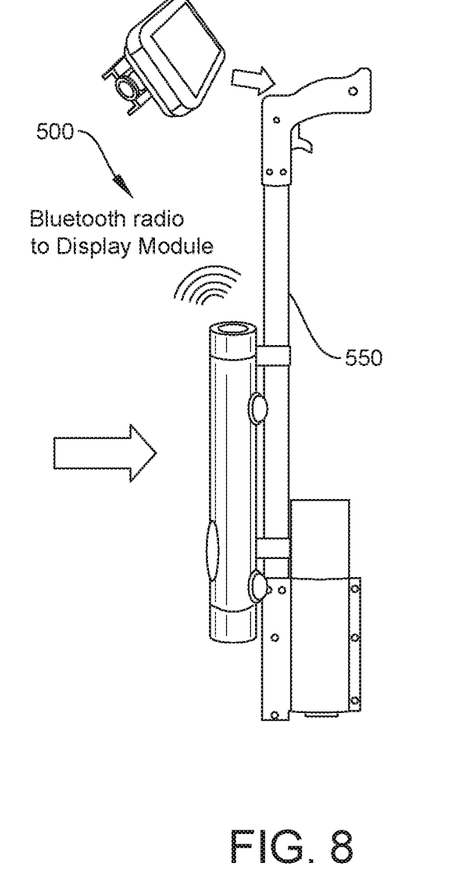
FIG. 8 is an illustration of the system for performing buried asset locate procedures, showing all components, according to an example embodiment.

FIG. 8 shows the device 100 connected or attached to a handheld paint marking device 550. In summary, the resulting system 500 combines all of the following functions: marker flag carrying, buried asset locating functions and paint marking.

Figure 9:
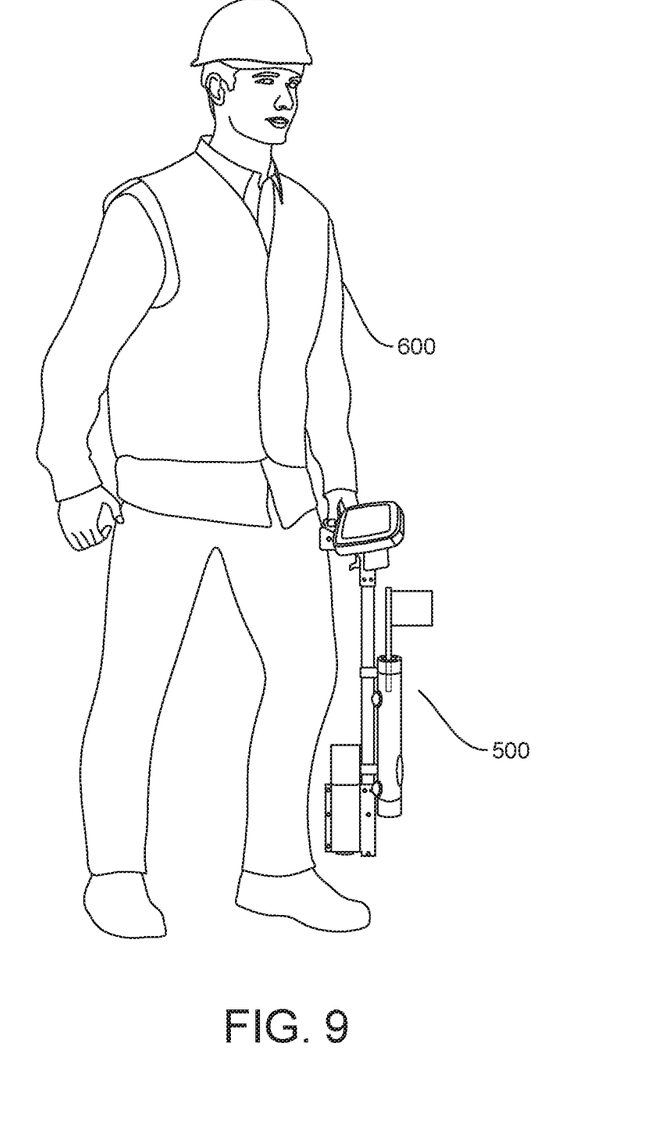
FIG. 9 is an illustration of the system for performing buried asset locate procedures during use, according to an example embodiment.

FIG. 9 shows a field technician 600 utilizing the system 500 (which comprises the device 100 and the device 550) to carry marker flags, perform buried asset locating procedures, and spray paint on the ground to indicate the placement of buried assets underground.

Figure 10:
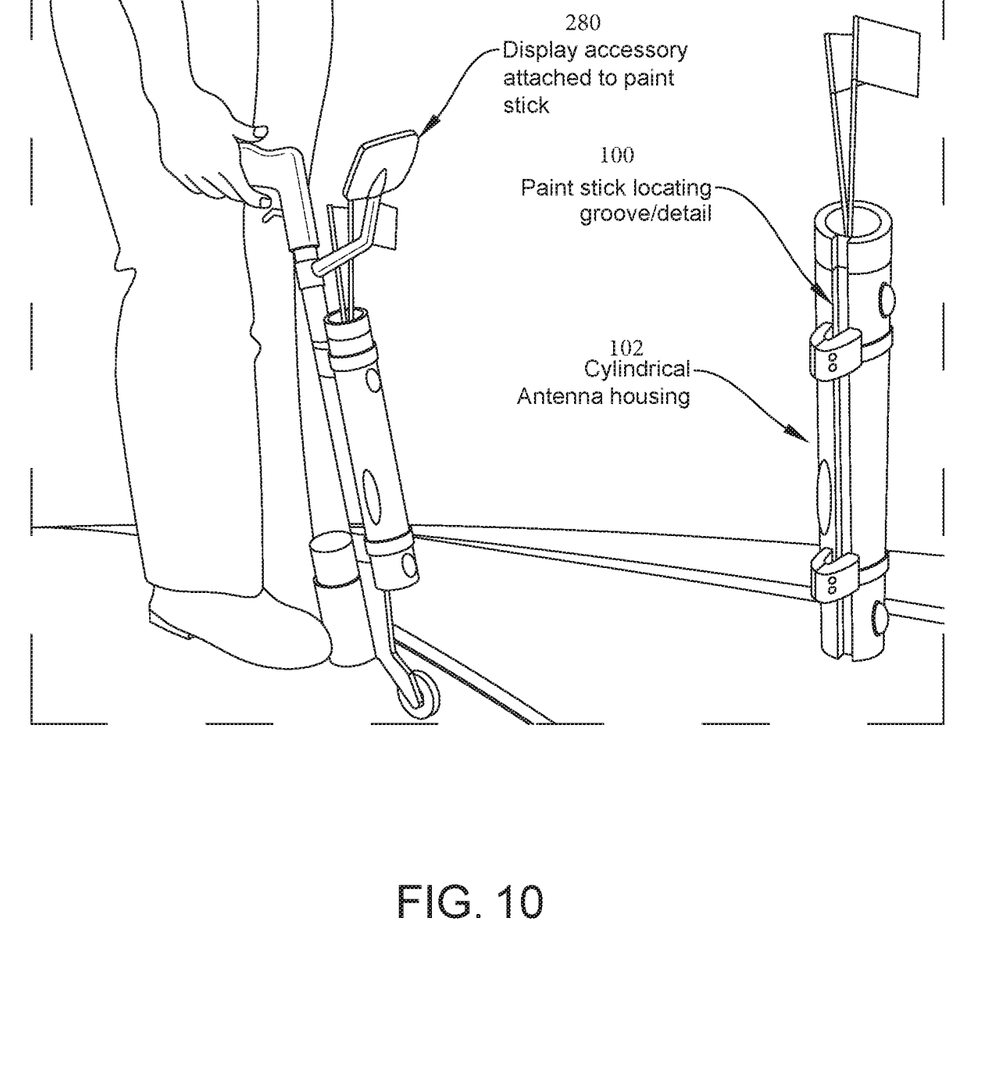
FIG. 10 is an illustration of a different version of the system for performing buried asset locate procedures during use, according to an example embodiment.
Figure 11:
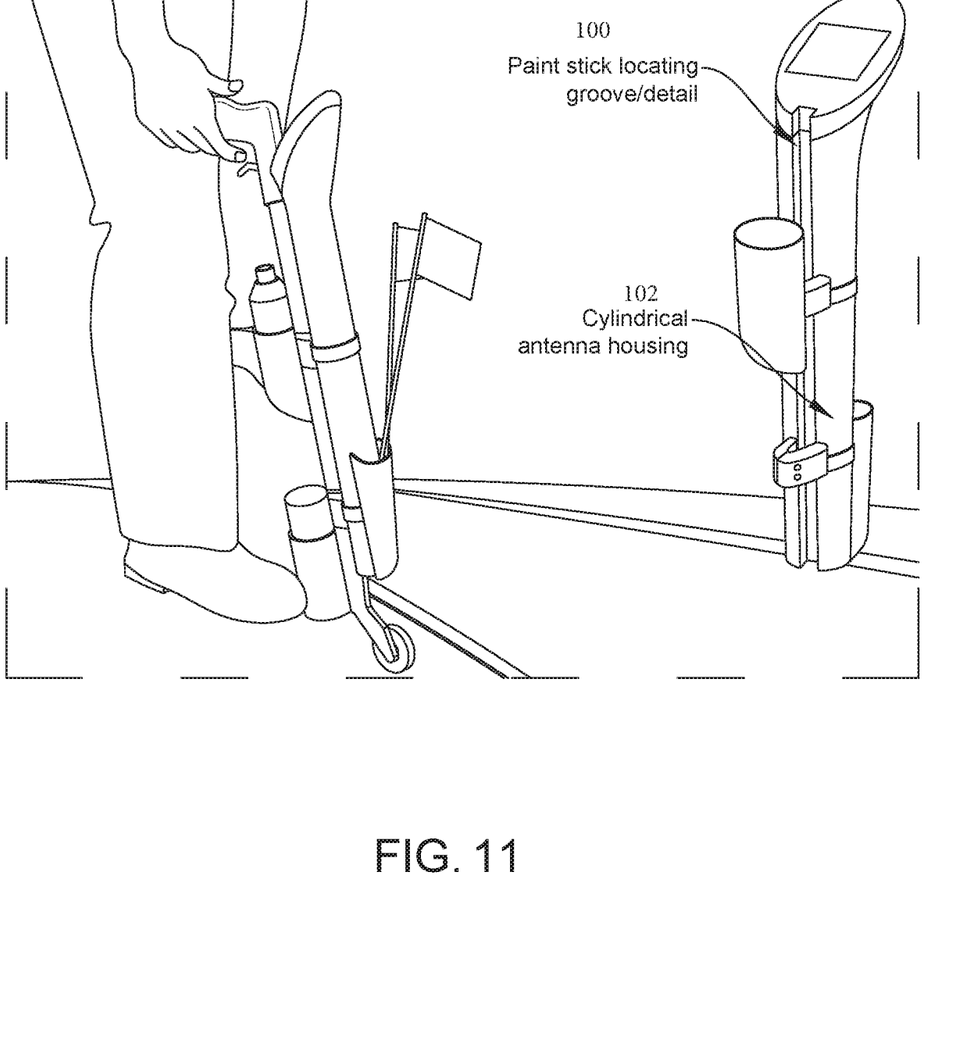
FIG. 11 is an illustration of a different version of the system for performing buried asset locate procedures during use, according to an example embodiment.
Figure 12:
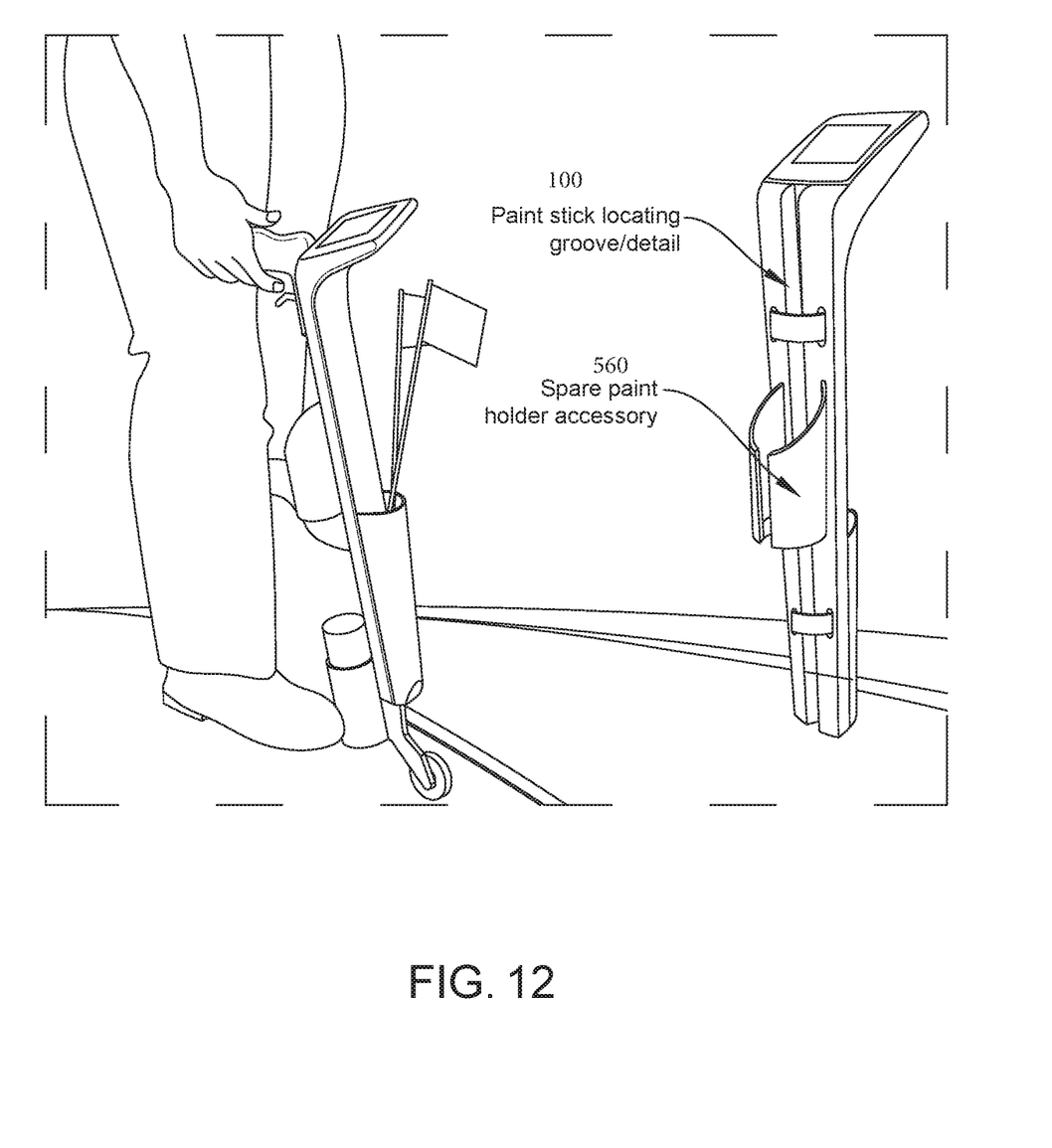
FIG. 12 is an illustration of a different version of the system for performing buried asset locate procedures during use, according to an example embodiment.
Figure 13:
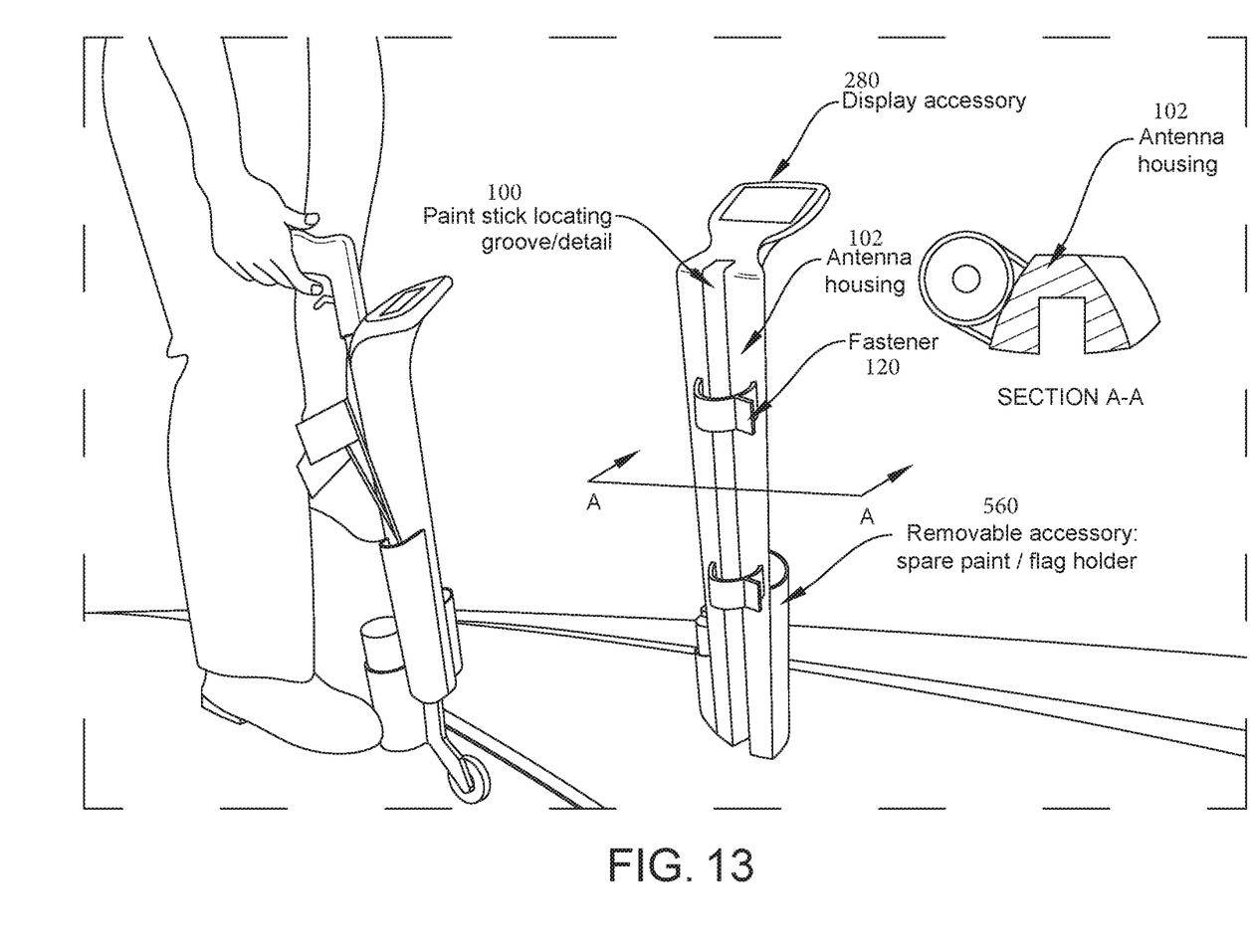
FIG. 13 is an illustration of a different version of the system for performing buried asset locate procedures during use, according to an example embodiment.

FIG. 10 shows an alternative embodiment wherein the device 100 is coupled to a paint marking device 550, and the display 280 is coupled to the paint marking device 550. FIG. 11 shows another alternative embodiment wherein the device 100 is coupled to a paint marking device 550, and wherein the device 100 is integrated with the interface 280. FIG. 12 also shows another alternative embodiment wherein the device 100 is coupled to a paint marking device 550, and wherein the device 100 is integrated with the interface 280. FIG. 13 also shows another alternative embodiment wherein the device 100 is coupled to a paint marking device 550, and wherein the device 100 is integrated with the interface 280.

Figure 14:
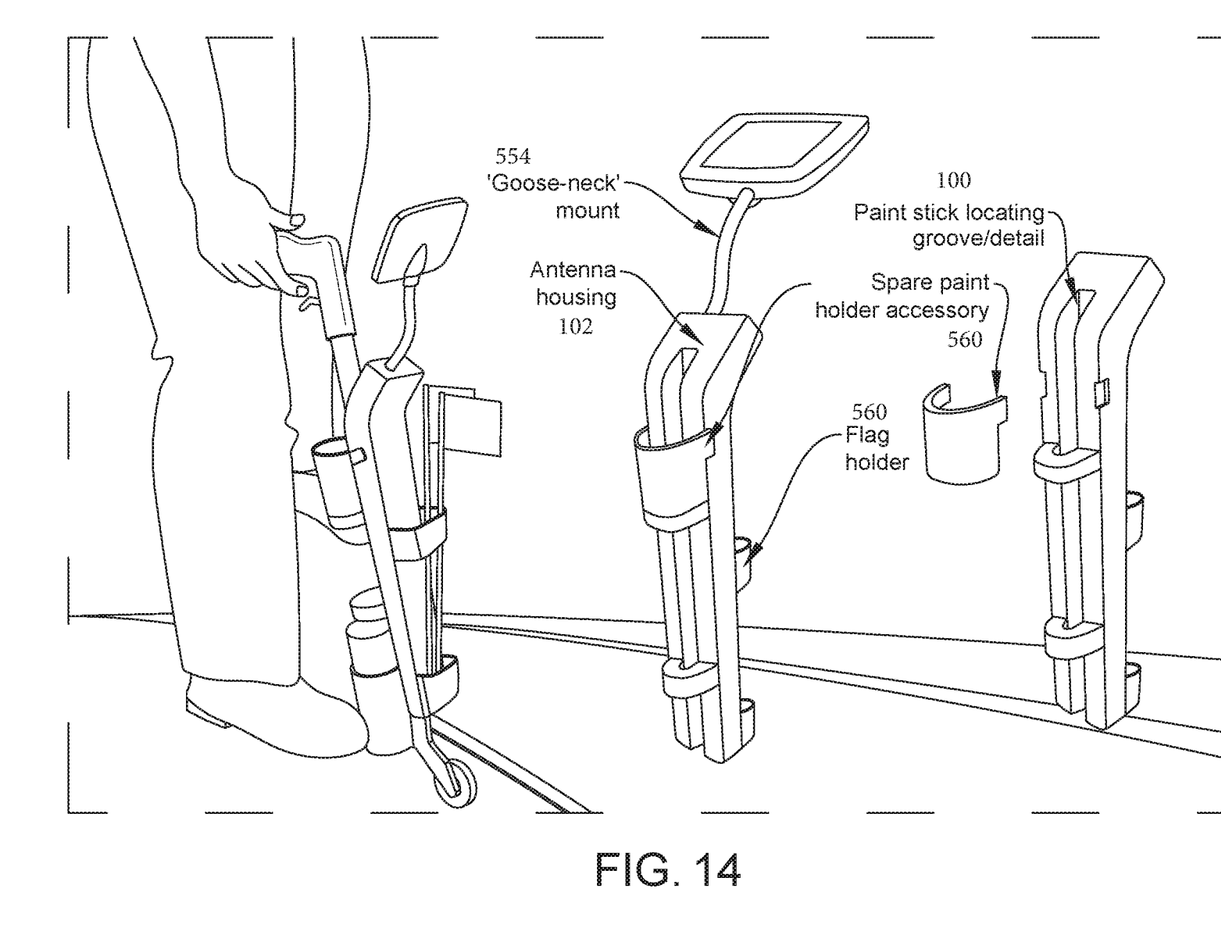
FIG. 14 is an illustration of a different version of the system for performing buried asset locate procedures during use, according to an example embodiment.

FIG. 14 shows an alternative embodiment wherein the device 100 is coupled to a paint marking device 550, and the display 280 is coupled to the paint marking device 550.

Generally, consistent with embodiments herein, program modules may include routines, programs, components, data structures, and other types of structures that may perform particular tasks or that may implement particular abstract data types. Moreover, embodiments herein may be practiced with other computer system configurations, including handheld devices, multiprocessor systems, microprocessor-based or programmable consumer electronics, minicomputers, mainframe computers, and the like. Embodiments herein may also be practiced in distributed computing environments where tasks are performed by remote processing devices that are linked through a communications network. In a distributed computing environment, program modules may be located in both local and remote memory storage devices.

Furthermore, embodiments herein may be practiced in an electrical circuit comprising discrete electronic elements, packaged or integrated electronic chips containing logic gates, a circuit utilizing a microprocessor, or on a single chip (such as a System on Chip) containing electronic elements or microprocessors. Embodiments herein may also be practiced using other technologies capable of performing logical operations such as, for example, AND, OR, and NOT, including but not limited to mechanical, optical, fluidic, and quantum technologies. In addition, embodiments herein may be practiced within a general purpose computer or in any other circuits or systems.

Embodiments herein, for example, are described above with reference to block diagrams and/or operational illustrations of methods, systems, and computer program products according to said embodiments. The functions/acts noted in the blocks may occur out of the order as shown in any flowchart. For example, two blocks shown in succession may in fact be executed substantially concurrently or the blocks may sometimes be executed in the reverse order, depending upon the functionality/acts involved.

While certain embodiments have been described, other embodiments may exist. Furthermore, although embodiments herein have been described as being associated with data stored in memory and other storage mediums, data can also be stored on or read from other types of computer-readable media, such as secondary storage devices, like hard disks, floppy disks, or a CD-ROM, or other forms of RAM or ROM. Further, the disclosed methods' stages may be modified in any manner, including by reordering stages and/or inserting or deleting stages, without departing from the claimed subject matter.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A system for performing buried asset locate procedures with quality control and quality assurance processes, the system comprising:

a tubular element with a top open end and a closed bottom end, the tubular element configured for holding a plurality of marker flags;

at least three electromagnetic antennas located at least partially within the tubular element, the electromagnetic antennas configured for producing electromagnetic data responsive to an electromagnetic field emanating from a buried asset;

at least one PCBA located within the tubular element, the PCBA configured for reading electromagnetic data from the at least three electromagnetic antennas due to a buried asset, processing said electromagnetic data, and generating depth, current and location information about said buried asset based on said electromagnetic data;

a cylindrical cap having an open top end and an open bottom end, the cylindrical cap configured for fastening to the top end of the tubular element, wherein the cylindrical cap includes a battery for powering the at least one PCBA;

a display configured for communicative coupling to the at least one PCBA, wherein the display is configured for displaying the depth, current and location information produced by the at least one PCBA; and at least one fastener located on an exterior surface of the tubular element, the at least one fastener configured for coupling the tubular element to a handheld paint marking device.

2. The system of claim 1, wherein the cylindrical cap further comprises a processor configured for reading, in real time, the following raw data produced by the at least one PCBA as a result of performance of a buried asset location procedure by a field technician:

1) motion data from an accelerometer and a gyroscope, wherein said motion data is produced as a result of movement of the system by the field technician during performance of the buried asset location procedure;
2) electromagnetic data from one or more electromagnetic sensors, wherein said electromagnetic data is produced as a result of movement of the system by the field technician during performance of the buried asset location procedure;
3) a mode that is set by the field technician during performance of the buried asset location procedure.

3. The system of claim 2, wherein the cylindrical cap further comprises a global navigation satellite system (GNSS) processor configured for calculating a current global position.

4. The system of claim 3, further comprising a handheld paint marking device configured for coupling to the tubular element via the at least one fastener located on an exterior surface of the tubular element.

* * * * *